United States Patent [19]
Lowe

[11] Patent Number: 6,070,172
[45] Date of Patent: May 30, 2000

[54] ON-LINE FREE SPACE DEFRAGMENTATION OF A CONTIGUOUS-FILE FILE SYSTEM

[75] Inventor: David A. Lowe, Foster City, Calif.

[73] Assignee: Oracle Corporation, Redwood Shores, Calif.

[21] Appl. No.: 08/813,811

[22] Filed: Mar. 6, 1997

[51] Int. Cl.[7] ................................................ G06F 17/30
[52] U.S. Cl. .......................... 707/205; 711/165; 711/173
[58] Field of Search ................................. 707/200, 205, 707/204; 711/171, 172, 112, 113, 165, 170, 173

[56] References Cited

U.S. PATENT DOCUMENTS

| | | | |
|---|---|---|---|
| 5,345,584 | 9/1994 | Hill | 711/170 |
| 5,555,405 | 9/1996 | Griesmer et al. | 707/205 |
| 5,745,756 | 4/1998 | Henley | 707/204 |
| 5,778,392 | 7/1998 | Stockman et al. | 707/205 |
| 5,819,290 | 10/1998 | Fujita | 707/2 |

OTHER PUBLICATIONS

Abstract of the Japanese Patent Application No. JP 07050189, filed on Mar. 9, 1995, titled "Device for Rearranging Space inside Disk", Sep. 1996.

*Primary Examiner*—Hosain T. Alam
*Attorney, Agent, or Firm*—McDermott, Will & Emery

[57] ABSTRACT

A file system configuration is scored by summing the squares of the sizes of each contiguous section of free space. A set of defragmentation plans, each describing a sequence of file movements, is generated and scored. The defragmentation plan with the highest score is chosen and executed. In moving a file, a temporary file of the same size is created and the file is copied to the temporary file. After the copying, the temporary file is designated as the file, and the file system space originally occupied by the file is unallocated.

28 Claims, 6 Drawing Sheets

Figure 1

|    | 1 | 2 | 3 | 4 | 5 | 6 | 7 | 8 | 9 | 10 | 11 | 12 | 13 | 14 | 15 |
|----|---|---|---|---|---|---|---|---|---|----|----|----|----|----|----|
| 1A |   | A | A |   |   | B | B | B | B | B  | C  | C  | C  |    |    |
| 1B | a | A | A |   |   | B | B | B | B | B  | C  | C  | C  |    |    |
| 1C | A |   | A |   |   | B | B | B | B | B  | C  | C  | C  |    |    |
| 1D | A | a | A |   |   | B | B | B | B | B  | C  | C  | C  |    |    |
| 1E | A | A |   |   |   | B | B | B | B | B  | C  | C  | C  |    |    |
| 1F | A | A | B | B | B | B |   |   |   | C  | C  | C  |    |    |    |
| 1G | A | A | B | B | B | B | C | C | C |    |    |    |    |    |    |
| 1H | A | A | B | B | B | B | C | C | C | D  | D  | D  | D  |    |    |

Figure 2

| 1A | | A | A | | | B | B | B | B | B | C | C | C | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |

| 2A | D | A | A | D | D | B | B | B | B | B | C | C | C | D | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |

Figure 4

| 4A | | A | A | | | B | B | B | B | B | C | C | C | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |

| 4B | | | | A | A | B | B | B | B | B | C | C | C | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |

| 4C | | | | | | B | B | B | B | B | C | C | C | A | A |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |

Figure 5

| 5A | | A | A | | | B | B | B | B | B | C | C | C | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |

| 5B | | A | A | | | B | B | B | B | B | C | C | C | a | a |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |

| 5C | | | | | | B | B | B | B | B | C | C | C | A | A |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |

| 5D | D | D | D | D | | B | B | B | B | B | C | C | C | A | A |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |

Figure 7

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 7A | | A | A | A | A | A | A | A | A | B | C | C | C | | | | | | | | | | | | |
| 7B | | | | | | | | | | | | B | C | C | C | | | A | A | A | A | A | A | A | |
| 7C | B | | A | A | A | A | A | A | A | | | C | C | C | | | | | | | | | | | |
| 7D | | | A | A | A | A | A | A | A | | | C | C | C | | | | | | | | | | | B |
| 7E | | | A | A | A | A | A | A | B | | | | | | | | | | | | | | C | C | C |
| 7F | B | | A | A | A | A | A | A | A | | | | | | | | | | | | | | C | C | C |

ON-LINE FREE SPACE DEFRAGMENTATION OF A CONTIGUOUS-FILE FILE SYSTEM

FIELD OF THE INVENTION

The present invention relates to computer systems, and more specifically, to mechanisms for determining the arrangement of a computer storage device.

BACKGROUND OF THE INVENTION

A file system is an organized collection of computer files, stored in a computer readable storage medium, such as a hard disk, a floppy disk, or a magnetic tape. The fundamental unit of storage for a file system is a block, usually of a fixed size, and files are stored in one or more blocks. Blocks may either be allocated or free. Allocated blocks are those blocks which are currently being used to store a file or a part of file, if the file is larger than the block size. Free blocks are not in use and are available for storing a new file. The collection of all the free blocks in a file system is termed the free space.

For example, with reference to FIG. 1, file system 1A consists of fifteen blocks, labelled 1–15. Blocks 2 and 3 are allocated to file A, blocks 6–10 are allocated to file B, and blocks 11–13 are allocated to file C. The free space of file system 1A comprises blocks 1, 4–5, and 14–15, for a total of five blocks. File system 1G also comprises three files of two, five, and three blocks in size, and five free blocks, but its free space comprises a different set of blocks, blocks 11–15.

Contiguous blocks are those blocks which are found next to each other in the storage medium. Due to the physical properties of the storage device, data from contiguous blocks may be read faster than from non-contiguous blocks. As a result, contiguous blocks are highly valued in a file system, because performance is optimized if a file is stored in contiguous blocks. In the example, file B stored in file system 1A comprises five contiguous blocks, located at blocks 6–10. The largest contiguous free space in file system 1A is two blocks, one of which is found at blocks 4–5. On the other hand, the largest contiguous free space in file system 1G is five blocks, located at blocks 11–15.

In order to store a file in contiguous blocks, a sufficient number of contiguous free blocks in the free space must be found. However, over the course of creating and deleting files it is common for the free space to become fragmented. A fragmented free space is one in which the free blocks are not in a large contiguous section but spread out into much smaller sections throughout the file system. In FIG. 1, the free space of file system 1A is fragmented into three fragments at blocks 1, 4–5, and 14–15. On the other hand, the free space in file system 1G is not fragmented but contiguous. Therefore, it is possible that there is an insufficient number of contiguous free blocks to store a file, even though the total number of free blocks is more than enough to store the file. In the example, both file systems 1A and 1G have five free blocks of storage, but only file system 1G can contiguously store a four-block file.

One conventional response to the problem of free space fragmentation is to "squeeze" the file system. During a squeeze operation, all the files are shifted over the beginning or to the end of the file system. For example, file A of file system 1A is shifted block-by-block from blocks 2–3 to blocks 1–2. During the shift, the first block of file A at block 2 is copied to block 1 (see file system 1B), and block 2 is freed (see 1C), leaving file A temporarily fragmented. Next, the second block is copied from block 3 to block 2 (see 1D), and block 3 is freed, resulting in file system 1E. After file A was shifted, file B is shifted by a similar procedure from blocks 6–10 to blocks 3–7 (see 1F), and file C from blocks 11–13 to blocks 8–10 (see 1G). These movements result in a contiguous free space comprising blocks 11–15 for five blocks and enough room to contiguously store file D at blocks 11–14 (see 1H).

Squeezing a file system requires shifting every file located after the first unallocated block in the file system. In this example, a total of ten blocks were shifted to produce file system 1G from file system 1A. This process may take quite some time to complete, and the user who wishes to store a file must wait for the free space to be defragmented.

As a result, a more common conventional response to the fragmentation of free space is to allow the file system to store files in non-contiguous blocks. Thus, in FIG. 2 a four-block file D is stored within file system 2A in three non-contiguous fragments at blocks 1, 4–5, and 14. File systems which allow files to be stored in non-contiguous blocks or "fragmented" are called non-contiguous file systems. Although non-contiguous file systems allow all the available blocks to be allocated in storing files and enable a file to be stored immediately, reading a fragmented file is slower than reading a contiguous file. For example, reading file D of file system 2A involves reading block 1, skipping to block 4, reading blocks 4 and 5, skipping to block 14, and finally reading block 14. There is a performance penalty every time a block is skipped.

A video system server, which is a file system dedicated to storing and playing back video files, however, imposes a set of constraints which make either conventional solution, squeezing the file system or allowing fragmented files, disadvantageous. In playing back a video file, the amount of time involved in reading the video file from the file system is so important that the video file must be stored contiguously. Therefore, the performance penalty of the fragmented file approach is simply unacceptable for use in high-performance video system servers. As a result, a video system server requires that every file be contiguously stored.

The squeeze defragmentation solution, on the other hand, is also disadvantageous. Recall that during the shift operation of a file, the file is temporarily fragmented (compare file system 1C). This fact means that the video file is unavailable for play back during the shift operation. Moreover, if the file is being played back during the squeeze defragmentation, the procedure must wait for the play back to complete. Therefore, squeezing a file system requires that the file system be taken off-line during the defragmentation. As a result, an on-line video system server requires that every file continues to be contiguously stored, even during a defragmentation, so that every video file may be played back.

In addition, video files are typically very large, about two gigabytes, but squeezing a file system moves many files, a very time-consuming task further exasperating the problem of the video server being off-line. Therefore, there is a need for on-line defragmentation of a high-performance, contiguous-file file system, such as a video system server.

SUMMARY OF THE INVENTION

In accordance with the present invention, a method for increasing contiguous free space of a file system comprises the steps of generating a set of defragmentation plans, scoring the set of defragmentation plans, choosing the defragmentation plan with the highest score, and executing the chosen defragmentation plan. In another aspect, the score for each defragmentation plan is determined by the summation of the squares of the sizes of each contiguous section of unallocated blocks. In yet another aspect, the set of defragmentation plans is pruned.

In accordance with another aspect of the present invention, a file is moved in accordance with the chosen defragmentation plan by creating a temporary file of the same size in a free region. The file is copied to the temporary file and the temporary file is designated as the file, and the file system space originally occupied by the file is unallocated.

In accordance with the present invention, a computer readable medium stores a sequences of instructions for increasing contiguous free space of a file system. The computer readable medium includes instructions for performing the steps of generating a set of defragmentation plans, scoring the set of defragmentation plans, choosing the defragmentation plan with the highest score, and executing the chosen defragmentation plan.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a diagram depicting file system states of a conventional free space defragmentation.

FIG. 2 is a diagram depicting a non-contiguous-file file system.

FIG. 4 is a diagram depicting three contiguous-file file systems.

FIG. 5 is a diagram depicting the file system states during a defragmentation according to an embodiment of the present invention.

FIG. 7 is a diagram depicting the file system states during a defragmentation according to another embodiment of the invention.

DESCRIPTION OF THE PREFERRED EMBODIMENT

A method and apparatus for defragmenting the free space of a file system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 3:
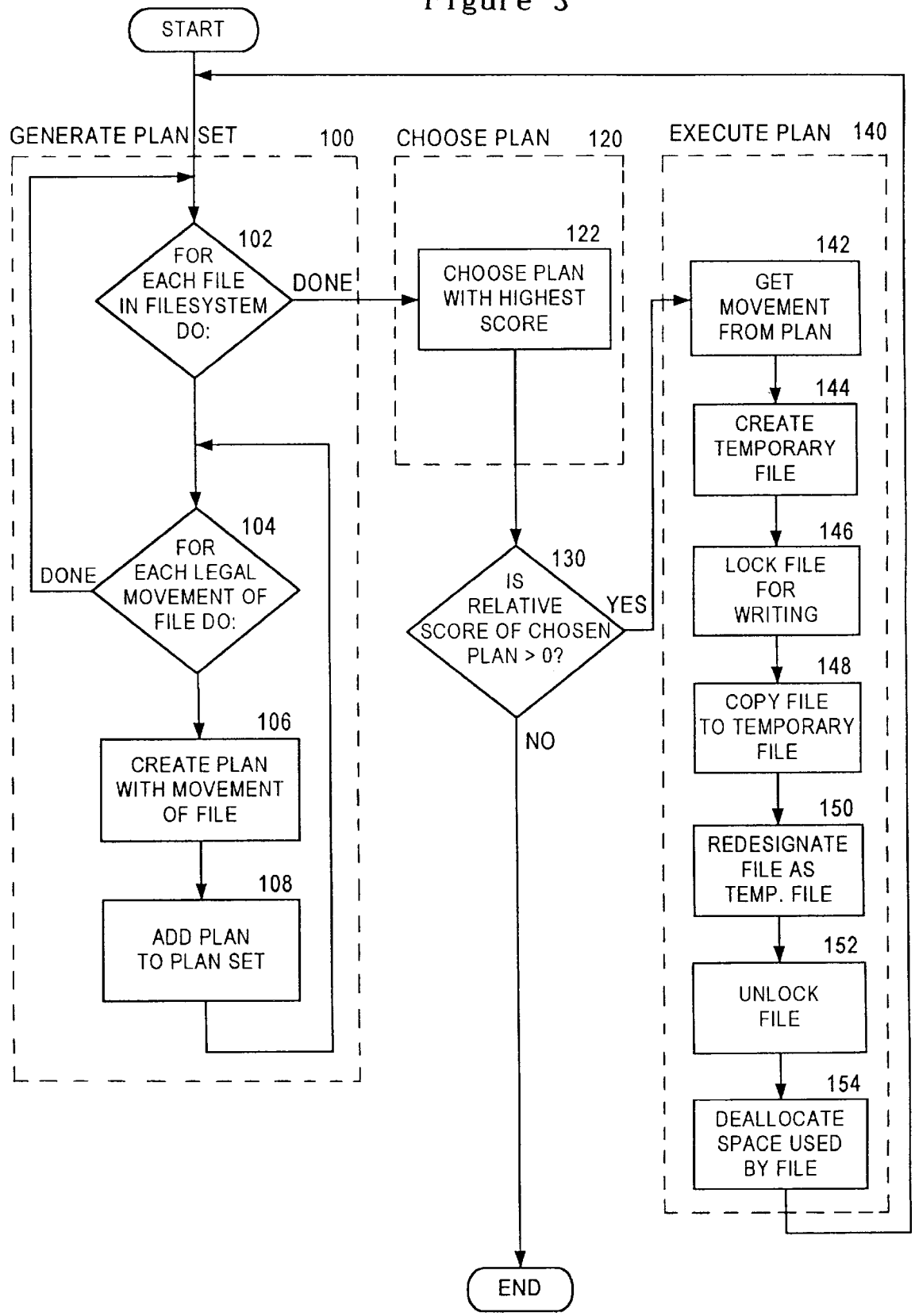
FIG. 3 is a flowchart describing the operation of an embodiment of the invention.

According to one embodiment of the invention, the defragmentation of the free space of a contiguous-file file system is described with reference to the flowchart of FIG. 3. First, a set of plans is generated (step 100), in which each plan describes a legal file movement. A legal file movement is a movement of a file into a free space that is as large or larger than the size of the file. After the set of plans has been generated, the plan that produces a file system configuration with the highest score is chosen (step 120). If no plan produces a configuration with a higher score than its starting configuration (step 130), the defragmentation terminates. Otherwise, the highest scoring plan is executed, moving the files (step 140).

GENERATING PLANS

The set of plans is generated by considering each file in turn (step 102). For each file, each possible legal movement is considered in turn (step 104). For each possible legal movement, the method creates a plan, describing the movement (step 106). Each plan stores with each legal movement the following information: the file being moved, the destination for the movement, the score of the movement (described later), and information about the previous state of the file system. After a plan has been created, it is added to the set of plans (step 108).

Referring to FIG. 4, the free space of file system 4A is to be defragmented. The plans generated for moving file A of file system 4A are:

(1) shifting file A to blocks 4–5, resulting in file system 4B and (2) transferring file A to blocks 14–15, resulting in file system 4C.

There are no legal movements for either file B or file C because the largest contiguous free, space is only two blocks, while the sizes of file B and file C are each greater than that.

SCORING THE FREE SPACE FRAGMENTATION

After the plan set has been generated, the method chooses the plan that produces a file system configuration with the highest score (step 120). One embodiment of the invention employs a "sum-of-squares" metric for quantitatively describing the fragmentation of the free space. According to the sum-of-square:, metric, the size of each contiguous free region is squared and summed together. With reference to FIG. 4, file system 4A has three contiguous unallocated sections at blocks 1, 4–5, and 14–15. Accordingly, the sum-of-squares "score" for file system 4A is $1^2+2^2+2^2=9$. In file system 4B, the free space is fragmented into two unallocated sections at blocks 1–3 and 14–15 and has a sum-of-squares score of $3^2+2^2=13$. The free space of file system 4C comprises only one contiguous unallocated section at blocks 1–5, yielding a score of $5^2=25$. Thus, file system 4C is the file system with the least fragmented free space of the three file systems, according to the sum-of-squares metric.

Whenever a file is surrounded by free space on both sides, shifting the file to the right or to left should reduce the free space fragmentation of the file system, because the two free space fragments to the right and to the left of the shifted file are combined to form a larger contiguous section of unallocated space. In FIG. 4, suppose file A of file system 4A was shifted two blocks the right, yielding the configuration of file system 4B. Before the shift, file A was surrounded by one unallocated section to the left (block 1), and two unallocated sections to the right (blocks 4–5). After the shift, in file system 4B, file A has a three block unallocated section to the left (blocks 1–3). The sum-of-squares metric confirms this aspect of free space fragmentation, because file system 4B has a score, 13, greater than the score of file system 4A, 9.

PRECOMPUTING THE SCORES

The relative score for shifting a file is the difference between the sum-of-squares scores of the file system configurations before and after the shift operation. Thus, in the example, shifting file A two blocks to the rights yields a relative score of 13−9=4. The difference according the sum-of-squares metric of a shift operation is only a function of the size of the contiguous free space to either side of the file being shifted. Let a be an array of the sizes of the contiguous unallocated sections of the free space, the score of array a before the shift is $$a_1^2 + \ldots + (a_l^2 + a_r^2) + \ldots + a_n^2,$$

where n denotes the number of contiguous unallocated sections, $a_l$ the size of the unallocated section to the left of the file, and $a_r$ the size of the unallocated section to the right of file. After the shift, the score becomes:

$$a_1^2 + \ldots + (a_l + a_r)^2 + \ldots + a_n^2.$$

Therefore, the difference in score is $(a_l+a_r)^2 − (a_l^2+a_r^2)) = a_l^2 + 2a_l a_r + a_r^2 − a_l^2 − a_r^2 = 2a_l a_r$. In the example, $a_l=1$ and $a_r=2$, so $2a_l a_r = 2(1)2 = 4$.

This derivation exposes several properties of the sum-of-squares metric. If the file is already next to another file, i.e., either $a_l=0$ or $a_r=0$, then the relative score, $2a_l a_r$, is zero. In this case, shifting a file that is already next to another file, does not improve the fragmentation of the free space because the operation merely trades one contiguous unallocated section for another.

The quantities $a_l$ and $a_r$ represent physical space free space and are thus non-negative. Since the product of two non-negative numbers is also non-negative, the relative score for a shift operation must likewise be non-negative. Thus the sum-of-squares metric confirms that shifting a file with free space on both sides reduces the free space fragmentation because the score is always positive.

If the file is to be transferred to a location other than the immediate right or left, the relative score is only a slightly more complicated calculation. Before the transfer the sum-of-squares score for a file system is:

$$a_1^2 + \ldots + (a_l^2 + a_r^2) + \ldots + a_t^2 + \ldots + a_n^2,$$

where $a_t$ further denotes the size of the free region to which the file is to transferred. Alter the transfer, the score becomes:

$$a_1^2 + \ldots + (a_l + a_r + s)^2 + \ldots + (a_t - s)^2 + \ldots + a_n^2,$$

where s further denotes the size of the file being transferred. Therefore the relative score for a transfer is $$(a_l^2 + a_r^2) + a_t^2 − (a_l + a_r + s)^2 − (a_t − s)^2$$

$$= 2(s + a_l)(s + a_r) − 2a_t s.$$

In FIG. 4, the absolute score for file system 4A is 9, and the absolute score for file system 4C, the result of moving file A to blocks 14–15, is 25. The relative score for the transfer of file A is consequently 25−9=16. Using the derived difference equation, s, the size of file A, is two; the size of the free space to the left, $a_l$, is one; the size of the free space to the right, $a_r$, is two; and the size of the destination is two blocks. Thus, the precomputed constant for file A is 2(2+1)(2+2)=24, and the relative score for transfer is 24−2(2)2=24−8=16, which agrees with our result. Likewise, shifting file A to blocks 4–5, resulting file system B, has a relative score of 4.

SCORING THE PLANS

Accordingly, each proposed movement of a file produces a relative score of either $2a_l a_r$ for a shift or $2(s+a_l)(s+a_r) − 2a_t s$ for a transfer. Since all the plans have the same starting point, the proposed movement with the best relative score generates the file system configuration with the best absolute score.

Therefore, only the relative scores of each proposed movement need be compared, avoiding the need to calculate the absolute score for any configuration of the file system. Moreover, since only the relative scores are being compared, the factor of 2, common to both relative scoring expressions, may be safely dropped.

In our example, before the movements for file A are considered, the scoring constant is first precomputed. Avoiding the common factor of 2, the precomputed constant for file A is $k=(s+a_l)(s+a_r)=(2+1)(2+2)=12$. Considering the shift operation of file A to blocks 4–5, the relative score is $a_l a_r = 2(1) = 2$. The relative score for the transfer of file A to blocks 14–15 is $k − a_t s = 12 − 2(2) = 8$. Therefore, the transfer has a higher relative score than the shift.

It is possible for the relative scores of two plans to be tied, or, in other words, two different configurations may have the same sum-of-squares scores. In this case, the tie is broken by choosing the plan that copies the lesser amount of blocks. In this manner, the amount of copying blocks is reduced.

CHOOSING THE HIGHEST SCORING PLAN

Since the generated set of plans is only used for choosing the highest scoring plan, a preferred embodiment of the invention keeps track of only the current highest scoring plan during the plan set generation phase. Thus, step 108 calculates the score for the newly created plan. If the score is higher than the current highest scoring plan, then the newly created plan is designated as the current highest scoring plan. In step 122, the current highest scoring plan at the end of the plan set generation phase is determined to the highest scoring plan for the entire plan set. As a result, the plan set need not be stored in its entirety, reducing the memory usage.

In our example, the plan describing the transfer of file A to blocks 14–15 has the highest relative score, 8, than the shift of file A to blocks 4–5. Therefore, the plan that describes a transfer of file to blocks 14–15 is the highest scoring plan.

EXECUTING THE PLANS

After the highest scoring plan has been chosen, the plan is executed according to the steps comprising step 140. The movement described by the plan is inspected (step 142), and a temporary file of the same size as the file to be moved is created in the destination space (step 144). The file is then write-locked to prevent changes to the file (step 146), and copied over to the temporary file (step 148). Referring to FIG. 5, temporary file a of the same size as file A has been created at blocks 14–15 (see file system 5B).

Once the copy is complete, the temporary file is designated to be the file (step 150). This designation may be accomplished by swapping the file attributes of the file and the temporary and then invoking a callback function to inform the readers of the file of the new file location. Once all the readers of the file have acknowledge the new location of the file, execution proceeds to step 152, where the space formerly occupied by the file is freed. In the example, this results in the file system 5C.

In this manner, on-line defragmentation of a video server system is achieved, because no file is ever stored, even temporarily, in a fragmented state. Furthermore, the use of the callback ensures that readers will be able to handle the new location of the file when they are ready.

Applying the defragmentation to file system 5C again, none of the proposed movements that can be generated will have a positive value. And only shifting file B from blocks 6–10 to blocks 1–5 has a relative score of 0. However, the tied is broken in favor not moving file B because fewer blocks are being moved.

After the defragmentation procedure, more free space is available to store a new, contiguous file. For example, file D of file system 5D now fits in the file system. Unlike the example of FIG. 3, where ten blocks are moved to defragment the free space, this embodiment of the present invention moves only two blocks.

PLANS DESCRIBING A SEQUENCE OF MOVES

As described above, one embodiment generates and searches a set of plans that is only one level deep ("greedy"). The greedy search, however, may miss some sequences of legal file movements that would result in a higher scoring file system configuration, even if the greedy search is repeatedly applied. For example, in FIG. 7, file system 7A comprises twenty-five blocks, of which blocks 3–10 are allocated to file A, block 11 to file B, and blocks 12–14 to file C. File system 7A has two free space fragments of size two and eleven, yielding a sum-of-squares score of 4+121= 125.

Considering the possible legal movements for file A, only the larger unallocated section is large enough for file A to be transferred into it. If file A is transferred to that block, as shown in file system 7B, the absolute score drops to $(2+0+8)^2+(11-8)^2=100+9=109$.

Considering the possible legal movements for file B, file B can fit into either free region. File B may transferred into the first free region resulting in the configuration of file system 7C, for an absolute score of 123. On the other hand, file B may be transferred into the second free region, as in file system 7D, for an absolute score of 105. Either proposes movement results in a net loss in the sum-of-squares score.

Finally, the only legal movement for file C is a shift operation, resulting the configuration of file system 7E, for no change in the absolute score. Since file system 7E has the same score as file system 7A, the tie is broken in favor of file system 7A before fewer blocks are copied (zero versus three). Thus, this greedy search terminates with no files being moved. Executing the greedy search again does not improve matters, because the file system remains unchanged and no single movement generates a score higher than the initial configuration.

However, transferring file B in file system 7E to block 1 results in file system 7F with a score of 1+144=145, greater than the score of file system 7A. Therefore, investigating plans describing a sequence of proposed movements may discover plans which can defragment the free space more fully than the greedy search.

Accordingly, a preferred embodiment of the invention generates a set of plans which describe a sequence of one of more proposed file movements before choosing the plan with the highest score. A plan is implemented as a list of proposed moves that must be applied in order. For each move, a relative score is calculated and the score for the plan is the sum of the relative scores of the proposed moves.

Figure 6:
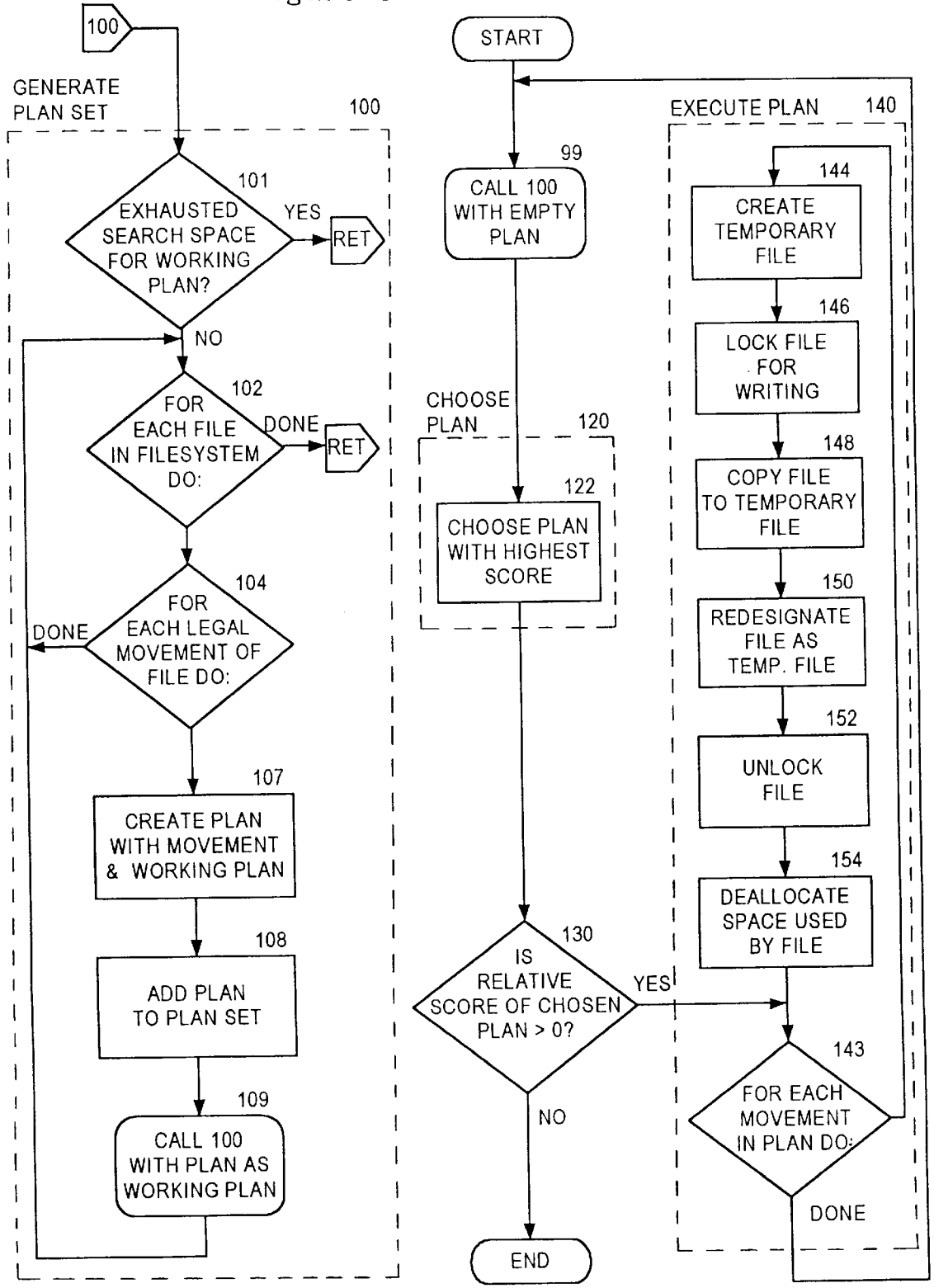
FIG. 6 is a flowchart describing the operation of an embodiment of the invention.

Referring to FIG. 6, a new plan is generated from an existing plan by appending a proposed move the sequence of proposed moves, using a bounded, recursive depth-first search. In step 99, the file server calls recursive function 100 with an empty plan, having no moves, to generate a set of plans. To prevent infinite recursion, the first step in the function, step 101, prunes the search space to a fixed depths, by checking the length of the sequence of movements. If the length of the sequence has reached a prescribed length (a length of six proposed movements has been found to be a good value), then the function returns. Otherwise, execution proceeds to the loop starting at step 102 which is similar to the loop of step 102 in FIG. 3, except for steps 107 and 109. Step 107 creates a new plan using the working plan and the legal movement generated in step 104. Step 109 is a recursive call to function 100, in which a copy of the new plan is created as the working plan for next level of the depth-first search.

Since the plan set generating function 100 of this embodiment generates plans with a sequences of moves, the execute plan function 140 needs a loop to perform is file Transfer in sequence. Step 143 of FIG. 6 implements that loop.

PRUNING THE PLANS

Since the number of plans being generated grows exponentially with the depth of the search, one embodiment of the invention prunes the set of generated plans at every depth in the search. In choosing which plan to prune, the same scoring metric is used.

One method of pruning, is to keep track the highest scoring n plans for each depth. Thus, if before step 109 a new plan is generated which is not one of n highest scoring planes for that depth, then the recursive call at step 109 is aborted. In another method, the value of n depends on the depth, so that n decreases as the depth increases.

Yet another method of pruning is to use a relative error bound, in which if the new plan has a score whose magnitude is relatively close to a previously generated plan, then it is discarded. For, example, if the relative error bound is 5% and a plan with a score of 62 was already generated, then later plans with scores of 61 and 64 would be discarded. However, a new plan with a score of 100 would be retained.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for increasing contiguous free space of a file system, said file system including a set of files and a set of unallocated sections, said method comprising the computer-implemented steps of:

generating a plurality of plans, wherein each of the plans specifies a sequence of a plurality of proposed moves, wherein each of the proposed moves describes a movement of one or more blocks of a file to a target unallocated section;

calculating scores respectively for the plans;

selecting a defragmentation plan from among the plans, based on the scores; and executing the sequence of proposed moves in said defragmentation plan.

2. The method of claim 1, wherein each of the proposed moves describes a movement of a contiguous file to a target unallocated section having at least as many blocks as a number of blocks allocated for the file.

3. The method of claim 2, wherein the step of generating a plurality of plans includes the steps of:

choosing a file from a set of files allocated within the file system;

choosing a working plan from one or more previously generated plans;

generating a set of new plans from said working plan, wherein the sequence of proposed moves of each new plan specifies the sequence of proposed moves of the working plan, appended by a new proposed move, wherein the new proposed more describes a movement of said file to a target unallocated section having at least as blocks as a number of blocks allocated for said file; and choosing a new plan from among the set of new plans for the plurality of plans.

4. The method of claim 3, wherein the step of generating a set of new plans from said working plan, includes the step of:

generating a set of new plans from said work plan, wherein the length of the sequence of proposed moves of each new plan is less than a prescribed length.

5. The method of claim 3, further comprising the step of pruning said set of new plans after the step of generating a set of new plans.

6. The method of claim 5, wherein the step of pruning said set of new plans includes the steps of:

determining a new score for each of said set of new plans;

establishing a maximum set size; and removing a new plan from said set of new plans, wherein the new plan has a lowest new score of said set of new plans, until the size of said set of new plans is less than said maximum set size.

7. The method of claim 6, wherein the step of establishing a maximum set size includes the step of:

establishing a maximum set size based upon the length of the sequence of said working plan.

8. The method of claim 5, wherein the step of pruning said set of new plans includes the steps of:

determining a new score for each of new plans of said set of new plans; and removing a new plan from said set of new plans having a new score that is within a prescribed percentage of the new score of another new plan of said set of new plans.

9. The method of claim 2, wherein the step of selecting a defragmentation plan based on the scores includes selecting the defragmentation plan having a score at least as high as the score of any other of the plans.

10. The method of claim 9, wherein the step of calculating scores respectively for the plans includes the step of:

determining a score for a respective one of the plans according to a summation of the squares of the sizes of said unallocated regions of a configuration of said file system indicated by said plan and according to a summation of the sizes of the file of each proposed move.

11. The method of claim 9, wherein the step of calculating scores respective for the plans includes calculating a source for a plan including the steps of:

determining a relative score for each proposed move of the sequence of proposed moves of said plan;

summing the relative scores for each proposed move of the sequence of proposed moves of said plan;

summing the size of the file of each proposed move; and determining the score based on the sum of the relative scores and the sum of size of the file of each proposed move.

12. The method of claim 11, wherein:

said file has a left free region to the left of said file and a right free region to the right of said file; and the step of determining a relative score for a proposed move includes the steps of:

if the target free region is either the left free region or the right free region, then determining the relative score based on a product of the size of a left free region to the left of said file and the size of a right free region to the right of said file; and if the target free region is neither the left free region nor the right free region, then determining the relative score based on a difference between a term—based on the size of the file, the size of the left free region, and the right free region—and a product of the size of said file and the size of the target free region.

13. The method of claim 12, further comprising the step of computing said term before the step of generating said set of plans is completed.

14. The method of claim 2, wherein the step of executing the sequence of proposed moves in said defragmentation plan includes the steps of:

choosing a first proposed move, said first proposed move describing the movement of a file to a free region, in the sequence of proposed moves of said defragmentation plan;

creating a temporary file at a new location in the target unallocated section having the same size as the file;

copying the file to the temporary file;

when said copying is complete, designating the temporary file as the file; and after readers of said file have acknowledged the new location, unallocating the file system space originally occupied by the file.

15. A computer readable medium having stored thereon sequences of instructions for increasing contiguous free space of a file system, said file system including a set of files and a set of unallocated sections, said sequences of instructions including instructions for performing the steps of:

generating a plurality of plans, wherein each of the plans specifies a sequence of a plurality of proposed moves, wherein each of the proposed moves describes a movement of one or more blocks of a file to a target unallocated section;

calculating scores respectively for the plans;

selecting a defragmentation plan from among the plans, based on the scores; and executing the sequence of proposed moves in said defragmentation plan.

16. The computer readable medium of claim 15, wherein each of the proposed moves describes a movement of a contiguous file to a target allocated section having at least as many blocks as a number of blocks allocated for the file.

17. The computer readable medium of claim 16, wherein the step of selecting a defragmentation plan based on the scores includes selecting the defragmentation plan having a score at least as high as the score of any other of the plans.

18. The computer readable medium of claim 17, wherein the step of calculating scores respective for the plans includes calculating a source for a plan including the steps of:

determining a relative score for each proposed move of the sequence of proposed moves of said plan;

summing the relative scores for each proposed move of the sequence of proposed moves of said plan;

summing the size of the file of each proposed move; and determining the score based on the sum of the relative scores and the sum of size of the file of each proposed move.

19. The computer readable medium of claim 18, wherein:

said file has a left free region to the left of said file and a right free region to the right of said file; and the step of determining a relative score for a proposed move includes the steps of:

if the target free region is either the left free region or the right free region, then determining the relative score based on a product of the size of a left free region to the left of said file and the size of a right free region to the right of said file; and if the target free region is neither the left free region nor the right free region, then determining the relative score based on a difference between a term—based on the size of the file, the size of the left free region, and the right free region—and a product of the size of said file and the size of the target free region.

20. The computer readable medium of claim 19, further comprising instructions for performing the step of computing said term before the step of generating said set of plans is completed.

21. The computer readable medium of claim 17, wherein the step of calculating scores respectively for the plans includes the step of:

determining a score for a respective one of the plans according to a summation of the squares of the sizes of said unallocated regions of a configuration of said file system indicated by said plan and according to a summation of the sizes of the file of each proposed move.

22. The computer readable medium of claim 16, wherein the step of generating a plurality of plans includes the steps of:

choosing a file from a set of files allocated within the file system;

choosing a working plan from one or more previously generated plans;

generating a set of new plans from said working plan, wherein the sequence of proposed moves of each new plan specifies the sequence of proposed moves of the working plan, appended by a new proposed move, wherein the new proposed move describes a movement of said file to a target unallocated section having at least as blocks as a number of blocks allocated for said file; and choosing a new plan from among the set of new plans for the plurality of plans.

23. The computer readable medium of claim 22, wherein the step of generating a set of new plans from said working plan, includes the step of:

generating a set of new plans from said work plan, wherein the length of the sequence of proposed moves of each new plan is less than a prescribed length.

24. The computer readable medium of claim 21, wherein the step of executing the sequence of proposed moves in said defragmentation plan includes the steps of:

choosing a first proposed move, said first proposed move describing the movement of a file to a free region, in the sequence of proposed moves of said defragmentation plan;

creating a temporary file at a new location in the target unallocated section having the same size as the file;

copying the file to the temporary file;

when said copying is complete, designating the temporary file as the file; and after readers of said file have acknowledged the new location, unallocating the file system space originally occupied by the file.

25. The computer readable medium of claim 15, further comprising instructions for performing the step of pruning said set of new plans after the step of generating a set of new plans.

26. The computer readable medium of claim 25, wherein the step of pruning said set of new plans includes the steps of:

determining a new score for each of said set of new plans;

establishing a maximum set size; and removing a new plan from said set of new plans, wherein the new plan has a lowest new score of said set of new plans, until the size of said set of new plans is less than said maximum set size.

27. The computer readable medium of claim 26, wherein the step of establishing a maximum set size includes the step of:

establishing a maximum set size based upon the length of the sequence of said working plan.

28. The computer readable medium of claim 25, wherein the step of pruning said set of new plans includes the steps of:

determining a new score for each of new plans of said set of new plans and removing a new plan from said set of new plans having a new score that is within a prescribed percentage of the new score of another new plan of said set of new plans.

* * * * *